United States Patent
Guglielmo et al.

(10) Patent No.: US 12,553,433 B2
(45) Date of Patent: Feb. 17, 2026

(54) INTUITIVE NATURAL GAS COMPRESSOR MONITORING SYSTEM

(71) Applicant: Inpro/Seal LLC, Rock Island, IL (US)

(72) Inventors: Kennon Guglielmo, San Antonio, TX (US); Terry Baldwin, Tulsa, OK (US); Jason Souder, San Antonio, TX (US); Ron Roth, San Antonio, TX (US); Saurabh Suresh, Cedar Park, TX (US)

(73) Assignee: Inpro/Seal LLC, Rock Island, IL (US)

( * ) Notice: Subject to any disclaimer, the term of this patent is extended or adjusted under 35 U.S.C. 154(b) by 688 days.

(21) Appl. No.: 17/618,653

(22) PCT Filed: Jul. 1, 2020

(86) PCT No.: PCT/US2020/040467
§ 371 (c)(1),
(2) Date: Dec. 13, 2021

(87) PCT Pub. No.: WO2021/003252
PCT Pub. Date: Jan. 7, 2021

(65) Prior Publication Data
US 2022/0299023 A1  Sep. 22, 2022

Related U.S. Application Data

(60) Provisional application No. 62/869,538, filed on Jul. 1, 2019.

(51) Int. Cl.
*F04B 51/00* (2006.01)
*F04B 49/06* (2006.01)
(Continued)

(52) U.S. Cl.
CPC ............ *F04B 51/00* (2013.01); *F04B 49/065* (2013.01); *F04B 49/103* (2013.01); *F04B 49/10* (2013.01);
(Continued)

(58) Field of Classification Search
CPC ...... F04B 51/00; F04B 49/065; F04B 49/103; F04B 2201/06; F04B 2201/0801;
(Continued)

(56) References Cited

U.S. PATENT DOCUMENTS 3,104,801 A   9/1963  Bancel
4,632,145 A   12/1986 Machu
(Continued)

FOREIGN PATENT DOCUMENTS

EP   0694693 A1   10/1998
EP   2032854 B1   11/2013
EP   2511526 A1   8/2019

OTHER PUBLICATIONS

IQS Director—Articles—Thermowells; pp. 2-3.*
(Continued)

*Primary Examiner* — Charles G Freay
*Assistant Examiner* — Lilya Pekarskaya
(74) *Attorney, Agent, or Firm* — Fish & Richardson P.C.

(57) ABSTRACT

A real-time monitoring system for skid-mounted reciprocating natural gas compressors. The system not only monitors performance and makes analytical diagnostic predictions of potentially problematic valves and such, but also has alert system for real-time monitoring, troubleshooting and diagnosing of such natural gas compressors—both locally and remotely. Operators can more efficiently and effectively manage maintenance and operation of the skid-mounted compressors with the implementation of LED equipped sensors that allow operators to locally quickly identify valves and other components requiring maintenance. Additionally, operators can remotely identify and understand deviations from optimal performance with the implementation of color-coded soft gauges.

15 Claims, 10 Drawing Sheets

(51) Int. Cl.
*F04B 49/10* (2006.01)
*G01M 15/05* (2006.01)

(52) U.S. Cl.
CPC ... *F04B 2201/06* (2013.01); *F04B 2201/0801* (2013.01); *F04B 2205/02* (2013.01); *F04B 2205/04* (2013.01); *G01M 15/05* (2013.01)

(58) Field of Classification Search
CPC .. F04B 2205/02; F04B 2205/04; F04B 49/10; G01M 15/05
See application file for complete search history.

(56) References Cited

U.S. PATENT DOCUMENTS

| | | | |
|---|---|---|---|
| 5,244,357 A | 9/1993 | Bauer | |
| 5,567,121 A | 10/1996 | Peterson | |
| 5,988,985 A | 11/1999 | Steinruck | |
| 6,292,757 B1 | 9/2001 | Flanagan et al. | |
| 6,485,265 B2 | 11/2002 | Schroeder et al. | |
| 6,738,244 B1 | 5/2004 | Lepley | |
| 7,403,850 B1* | 7/2008 | Boutin | G01M 15/05 701/107 |
| 10,344,754 B2 | 7/2019 | Andrich et al. | |
| 10,895,254 B2 | 1/2021 | Beisel | |
| 10,947,968 B2 | 3/2021 | Decook et al. | |
| 10,962,678 B2 | 3/2021 | Guglielmo et al. | |
| 10,995,594 B2* | 5/2021 | Beisel | F04B 49/065 |
| 2003/0025612 A1 | 2/2003 | Holmes et al. | |
| 2007/0065302 A1 | 3/2007 | Schmitz | |
| 2010/0086415 A1 | 4/2010 | Spiegel et al. | |
| 2012/0134850 A1* | 5/2012 | Grant | F04B 49/10 417/63 |
| 2013/0300574 A1* | 11/2013 | Gillette, II | G01M 3/22 340/870.01 |
| 2014/0005958 A1* | 1/2014 | Baliga | G01M 3/243 702/51 |
| 2014/0352916 A1* | 12/2014 | Kapaun | F25B 30/06 165/45 |
| 2014/0379300 A1* | 12/2014 | Devine | F04B 51/00 702/182 |
| 2016/0195029 A1 | 7/2016 | Bizub | |
| 2018/0163711 A1 | 6/2018 | Follmar et al. | |
| 2018/0202423 A1* | 7/2018 | Zhang | F04B 51/00 |
| 2018/0363641 A1 | 12/2018 | Follmar et al. | |
| 2020/0326454 A1* | 10/2020 | Guglielmo | G05B 19/0428 |
| 2021/0270262 A1 | 9/2021 | Decook et al. | |

OTHER PUBLICATIONS

Extended European Search Report in International Appln. No. 20834610.6, mailed on May 16, 2023, 6 pages.
International Preliminary Report on Patentability in International Appln. No. PCT/US2020/040467, mailed on Jan. 13, 2022, 6 pages.
International Search Report and Written Opinion in International Appln. No. PCT/US2020/040467, mailed on Oct. 9, 2020, 8 pages.

* cited by examiner

INTUITIVE NATURAL GAS COMPRESSOR MONITORING SYSTEM

PRIORITY CLAIM

This patent application is a U.S. national stage under 35 USC § 371 of International PCT Application No. PCT/US20/40467, filed on Jul. 1, 2020, which claims priority under 35 U.S.C. § 119 to U.S. Provisional Patent Application, Ser. No. 62/869,538, filed Jul. 1, 2019, the full disclosure of which are incorporated by this reference, as though now set forth here in their entireties.

FIELD

The disclosed embodiments relate to the field of natural gas production and distribution and, particularly, to the monitoring of skid-mounted reciprocating natural gas compressors commonly used in that field. Even more particularly, the disclosed embodiments pertain to a display strategy and an alert system for real-time monitoring, troubleshooting and diagnosing of such natural gas compressors—both locally and remotely.

BACKGROUND

Engine-driven reciprocating natural gas compressors have long been a critical part of the natural gas production and distribution industries. Assembled and mounted on skids together with pipes, tanks, scrubbers and other associated pieces of equipment and related controls, they can be custom engineered for a particular application and then easily transported to the field location where they are needed for compressing the natural gas—either at or near the well site or somewhere in the natural gas collection and distribution pipeline network. Perhaps the most popular domestic U.S. source for the compressors themselves is Ariel Corporation (Mount Vernon, Ohio), although such compressors can also be sourced from GE, Dresser Rand, and many others, including through service providers like Archrock, Exterran and CSI Compressco (all of Houston, Tex.). Meanwhile, Applicant is a source for sensors, valves, gauges and control panels (including those known as Murphy® panels) that are used on such skid-mounted compressor assemblies.

Such compressors are necessarily robust so that they can be reliably used over several months with minimal unplanned interruptions, but their inherent complexity makes it difficult. Each compressor typically has multiple cylinders and corresponding piston throws, often in balanced configurations to each side of the crank case that is central to the compressor, and those throws are often grouped through plumbing to have multiple stages of compression. Each throw of the compressor has multiple suction and discharge valves—often four of each per cylinder, but can be as many as eight, twelve, or sixteen—and compressors are often also equipped with bypass valves for managing suction pressures, not to mention the valves and related controls for crank case lubrication, coolant circulation, and adjustment of displacement volumes, all of which results in dozens of valves that might get clogged by debris or residue in a typical compressor. Plus, each such valve can suffer general wear over time, which can diminish their performance. As a result, such compressors require maintenance and periodic shut-down for maintenance and if required—replacement of components. Maintenance is routine if done when the compressor is not being used or is at least not in a period of high demand. Shut-downs can be extremely costly for the end-operator if the shut down is required to correct a failure that happens during operation.

As valves degrade, become gooped-up, and/or partially obstructed, it becomes more and more difficult to deliver the demanded levels of compression. That, in turn, leads to underperformance and greater inefficiencies, which translates to greater energy consumption by the connected engine. Potentially much worse, diminished valve performance also increases the risk of overloading the compressor piston rods as the system compensates for excessive pressure losses. Over-loaded piston rods due to clogged or worn valves is one of the leading causes of major damage to compressors.

Properly maintained, though, engineers can typically manage the risks. For decades, using principles from thermodynamics and compressible fluid mechanics, engineering models have been developed for compressor designs and installations such that, given a particular first stage suction pressure and temperature for the natural gas, they can then determine the ideal range of both temperature and pressure of the natural gas for numerous key locations within the compressor. It should be understood that the engineering model referred to herein represents ideal operating parameters under particular operating conditions. Moreover, although the description of the embodiments herein is focused on use in natural gas compressors, it will be understood by those of ordinary skill in the art that the presently disclosed embodiments can also provide improvements and advantages in other systems used for compressing other types of gases, such as carbon dioxide, nitrogen, etc. Naturally, those ideal ranges depend on the operating speed, the plumbing, the valve settings (multiple suction and discharge valves for each throw of each compressor stage, plus sometimes supplemental valves and settings to control displacement volume and bypass), as well as the current instantaneous speed of the compressor's drive shaft, assuming everything is working properly. With such models, engineers can then troubleshoot poor performance by comparing the model to actual experience data using numerous sensors throughout the compressor, often storing such data being collected in dedicated databases for later analysis.

So, to monitor and help troubleshoot the compressors, engineers track the data coming from most if not all of the various sensors embedded in the compressor. From that, they can then use the engineering model to figure out and predict when there might be performance problems. Unfortunately, without real-time data (RTD), or without the ability to quickly interpret the real-time data even when they do have real-time data, troubleshooting by comparison to the ideal model generally has to wait until the data is returned to a central office for analysis. Back at the office, engineers can then make the comparisons for diagnosing problems or suggesting ways to improve operations, but this type of analysis has traditionally taken place on a time scale of days, and often based on limited or incomplete data sets. As an example, many compressor installations in the field include pressure and temperature sensors at the stage level but NOT at the throw level. This is in contrast to the disclosed embodiments wherein the sensors are positioned in the valve caps or in close proximity thereto. In addition, compressor installations for a company may consist of tens or hundreds of units making the data analysis and data mining of real-time compressor data daunting. Granted, such diagnostics can all be done real-time in a laboratory, and research facilities have been doing that for decades, but it has never been practical for the real world. Too many variables; too sensitive; too much going on in the field; too expensive as compared to the return on investment; too difficult for someone in the field to interpret; and not enough time. Too much and too little on many levels. As a result, subtle wear and associated performance problems go unnoticed for too long and often may lead to catastrophic failure without notice, and too often during periods of peak demand when the operator can little afford the down-time for repairs.

With growing availability of wireless data in many other industries, many have still dreamt of getting and continuously monitoring real time data in the natural gas industries. Unfortunately, this is easier said than done. The only successes in that direction have used very expensive systems that have not been widely accepted, in part due to their cost and complexity, in part because wireless data tends to be unreliable and have bandwidth trade-offs, and in part because a person has to be superhuman to process so much data and identify a likely cause for poor performance in real time. On top of that, dreams of advanced solutions have also been discouraged by the challenges and dangers of using conventional controls, transmitters and the like in an environment at risk of being filled with explosive natural gas, not to mention all the unpredictable levels of electromagnetic noise that could easily corrupt your data stream. As a result, by and large, despite the long-felt needs for better real-time monitoring and prediction and troubleshooting of parts failures and other problems in the field, the industry continues doing things the same ways as before, accepting the realities of uncertainties and resulting costly shut-downs as a cost of doing business.

Therefore, there is a long-felt need in the art for improved methods and systems for data collection and presentation in a way that can be more readily understood for use in troubleshooting and predicting problems with natural gas compressors. Moreover, there has been and still is a need to effectively process all that data in real time and to effectively notify operators if a problem is likely to develop—hopefully before it develops—and to efficiently and effectively identify which valves or the like have the greatest needs for attention when the operator goes to check on the skid. In the process, other related needs include improving ease of use and interpretation, reducing and controlling compressor down-time, managing costs, improving reliability, optimizing power consumption, and improving overall efficiency and performance.

Many other advantages, disadvantages, objectives, problems and challenges encountered in the design and monitoring of control systems for skid-mounted reciprocating natural gas compressors, and of the known diagnostic systems, displays and strategies therefor, will be evident to those of ordinary skill in the art, particularly after reading this specification and contemplating its implications.

SUMMARY

While each of the above-described technologies have long been well known in the field, there has understandably been no successful effort to implement real-time diagnostic displays for real-world skid-mounted natural gas compressors, much less a system that not only determines which valve(s) require attention based on engineering models for optimal operation, but a system that also immediately and intuitively directs the operator's attention to such valve(s). Despite the challenges, the pertinent industries have long needed such improvements, such as achieving realistic and yet reliable, affordable and easy-to-use approaches to such improvements. Still further objects include enabling safer, cleaner, simpler, quieter, and easier to assemble, install, connect, maintain, repair and troubleshoot, as well as being more reliable, affordable, efficient, versatile, effective, interchangeable and adaptable solutions to the needs of the prior art, all in a manner that practically and efficiently overcomes the many challenges and obstacles faced by skid-mounted reciprocating natural gas compressors.

The disclosed embodiments address many of such needs by providing an intuitive, skid-mounted reciprocating natural gas compressor monitoring system that not only monitors performance and makes analytical diagnostic predictions of potentially problematic valves and such, but also presents both the data and the predictions in ways that are intuitively understood by users of the system. Moreover, systems according to many aspects of the disclosed embodiments not only present the data and predictions to system users at the field location of the skid itself, but the same data is also wirelessly transmitted to back office processors for the service managing the compressor.

The intuitive approaches for presenting the data and diagnostic conclusions according to the teachings of the invention preferably involve a display strategy and an alert system for real-time monitoring, troubleshooting and diagnosing of such natural gas compressors—again, both locally and remotely. The approaches implemented intuitively communicate monitored information and corresponding predictions so operators can readily recognize and evaluate aberrant conditions and can more efficiently and effectively manage maintenance and operation of the skid-mounted compressors.

Much of the analysis is accomplished real-time by automatically evaluating real-time sensor data being monitored in comparison to engineering models for the compressor's operation. The monitored data is then displayed intuitively through gauges described as "soft", due to the strategy of varying the scale of the gauge face, preferably continuously and preferably in at least one (or both) of two respects: (i) first by safe-centering the scale display; and (ii) by color coding at least the safe or unsafe ranges of the gauge based on current operating parameters. Optimal centering of the display intuitively conveys how close to ideal the sensed condition is, by centering the scale of the display around what the reading would be if the compressor was operating perfectly for the current settings and conditions, as determined by the known engineering models for the compressor's operation, and as also determined based on the compressor's current settings and its current instantaneous drive shaft speed. Such optimally centered soft gauges enable a user to quickly and intuitively identify and understand deviations from optimal performance. This view of the gauge and understanding of the current state of the compressor performance can be done without the viewing of the actual measured values.

Preferably, the color-coded ranges of the soft gauge use the classic green, yellow and red approach to indicate safe (or good), marginal, and unsafe (or bad) ranges, respectively, for the monitored condition. More particularly, the green zone of the soft display corresponds with a range that is generally considered to be safe and effective, the red zone of the soft display corresponds with ranges that are generally considered to be so far from optimal that intervention is needed imminently in order to prevent catastrophic failure; and the yellow zone lies in between the green and red ranges, to highlight conditions at risk of becoming unsafe (or bad). Hence, the soft display approach intuitively conveys monitored conditions by displaying the current values in relation to a scale characterized by ideal performance of the monitored condition. More particularly, the optimal value for a particular monitored condition lies at the midpoint of the range of green (safe) values. Thus, one viewing a displayed soft gauge as herein shown and described will intuitively know that operation with respect to the particular monitored condition is ideal, particularly in relation to the engineering model, when the needle of the soft gauge is directly in the middle of the green zone. In other words, one would not even need to know the actual real-time reading in such a scenario to know that the reading indicates safe operation with respect to the particular monitored condition.

Another aspect of disclosed embodiments includes real-time detection of vibrations during operation of the compressor as well as associated spectral analysis of the vibration data. Disclosed embodiments include installation of one or more sensors that not only detect vibration but also temperature and pressure. For convenience, such tri-condition sensors will be referred to as PVT (Pressure, Vibration, Temperature) sensors. As part of the analysis of real-time vibration data, when appropriate, disclosed embodiments may set a fault when the detected vibration exceeds a threshold. Some embodiments further implement one or more interventions to change the real-time operating conditions of the compressor to reduce or eliminate the vibration to avoid subsequent damage that could result in costly downtime and/or repairs.

Many other objects, features, variations and advantages of the disclosed embodiments will be evident from a review of the further descriptions herein, particularly when reviewed by one of ordinary skill in the art with the benefit of the accompanying drawings, prior art, and any claims that may be associated with this specification.

BRIEF DESCRIPTION OF THE DRAWING FIGURES

An understanding of the disclosed systems and methods may be had by reference to the drawing figures, wherein like reference numerals often refer to like components and features.

FIG. 1 is a schematic, diagrammatic illustration of an embodiment of, which fundamentally is a skid-mounted monitoring system 100 within a larger system that includes a high-speed reciprocating natural gas compressor 170 operatively mounted on skid 99 together with associated components such as engine 110 and control panel 160, wherein that control panel 160 is operatively adapted to display monitored data in an intuitively diagnostic manner through displays 165 and 166 while also wirelessly transmitting such data to remote back office services 150 through a wireless telemetry gateway 510 for control panel 160.

FIG. 2 is a more detailed view showing details of a base compressor monitoring modules 181, 183, 185 mounted on compressor 170, as well as its connections to other elements of the system 100 shown in FIG. 1, which modules 181, 183, 185 serves to enable connection of numerous compressor sensors and their outputs to the control panel 160 of FIG. 1.

FIG. 3A shows a sample screen shot 300 displayed during operation of the skid-mounted monitoring system 100 of a preferred embodiment, the screen shot 300 being an example of the information displayed on the lower screen 166 of control panel 160 shown in FIG. 1, showing real-time operational readings on a variety of optimally-centered "soft" gauges 341-344 and 361-366 displayed on screen 166.

FIG. 3B shows an alternative screen display 300' having many of the same characteristics and serving much the same purposes as the sample screen shot 300 shown in FIG. 3A.

FIG. 4 is a closer view of some of the soft gauges 341-342 and 361-362 displaying real-time operational parameters, as appearing in the portion 4-4 of the display 300 shown in FIG. 3A.

FIG. 5A illustrates a partial side elevation view of the first throw 171 of compressor 170, which illustrates how some of the sensors used may be installed thereon, for connection to wire harness 186, as also shown schematically in FIG. 1.

FIG. 5B shows a sample screen shot 300 displayed during operation of the skid-mounted monitoring system 100, the screen shot 300 showing real-time operational readings, some of which are indicative a valve leak.

DETAILED DESCRIPTION OF THE EMBODIMENTS

The following descriptions relate to presently preferred embodiments and are not to be construed as describing limits to the invention, whereas the broader scope of the invention should instead be considered with reference to the claims, which may be now appended or may later be added or amended in this or related applications. Unless indicated otherwise, it should be understood that terms used in these descriptions generally have the same meanings as those that would be understood by persons of ordinary skill in the art, although they generally should not be restricted to formal or ideal definitions for purposes of understanding the scope of the invention. Rather, such words should be interpreted to conceptually encompass equivalents, unless and only to the extent that a particular context clearly requires otherwise.

For purposes of these descriptions, a few wording simplifications are also used universally, except to the extent otherwise clarified in a particular context either in the specification or in particular claims. The use of the term "or" should be understood as referring to alternatives, although it is generally used to mean "and/or" unless explicitly indicated to refer to alternatives only, or unless the alternatives are inherently mutually exclusive. When referencing values, the term "about" may be used to indicate an approximate value, generally one that could be read as being that value plus or minus half of the value. "A" or "an" and the like may mean one or more, unless clearly indicated otherwise. Such "one or more" meanings are most especially intended when references are made in conjunction with open-ended words such as "having," "comprising" or "including." Likewise, "another" object may mean at least a second object or more.

Figure 1:
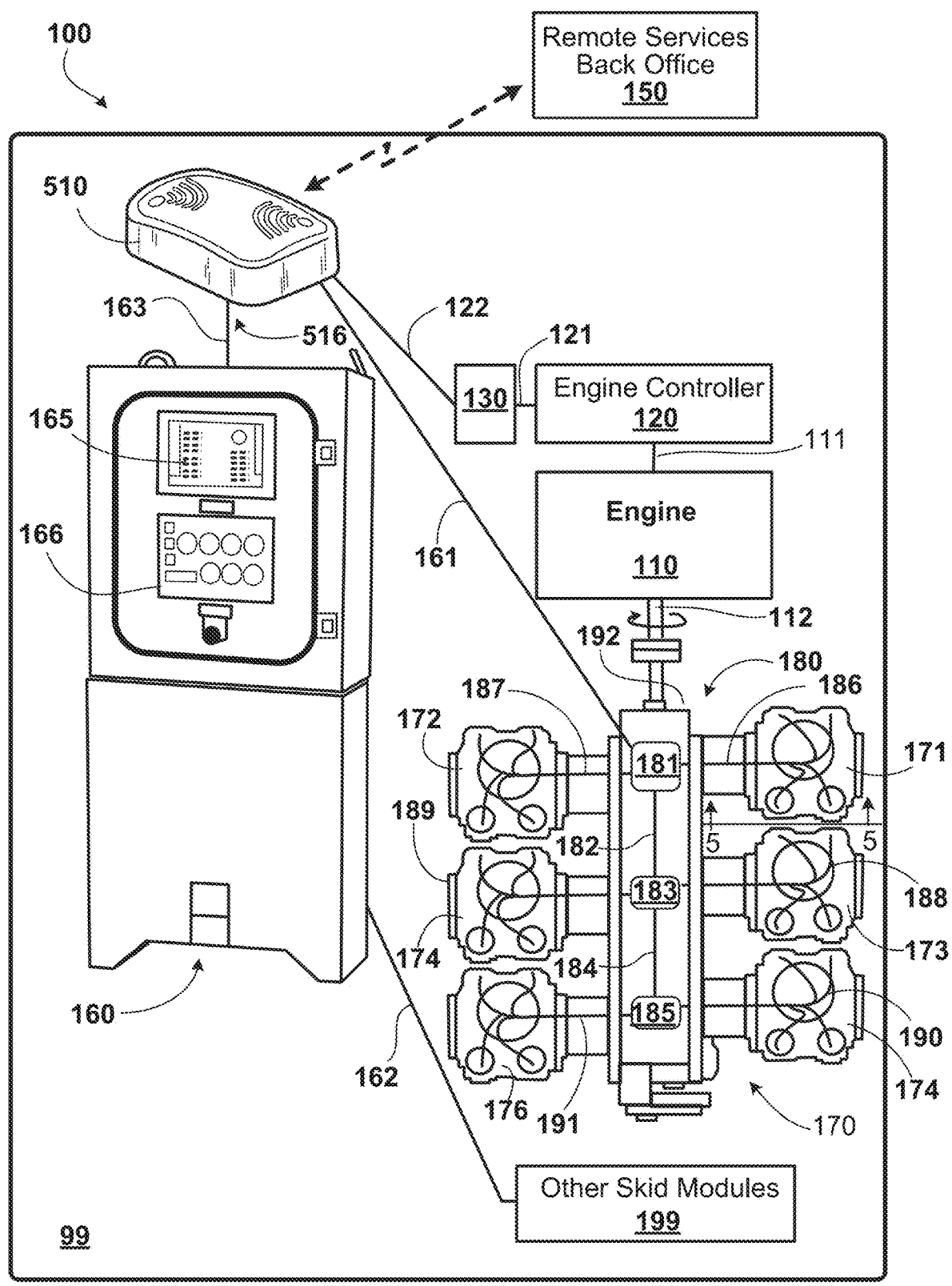

Turning to FIG. 1, there is shown a schematic diagram that illustrates a skid-mounted monitoring system 100 which represent a presently preferred embodiment 100 of the invention. The system skid mounted monitoring system 100 includes a high-speed, skid-mounted, reciprocating natural gas compressor 170 mounted on skid 99 together with associated components. Those associated components are most basically an engine 110 that serves to provide rotary power through a drive shaft 112 as the prime mover for compressor 170, and a control panel 160 which monitors and coordinates operation of compressor 170 and its engine 110, collecting and displaying operating data pertaining to each.

The compressor 170 may be any conventional high-speed reciprocating natural gas compressor, although the illustrated embodiment includes a multi-stage compressor made by Ariel. Although the disclosed embodiments can be used with compressors having any number of cylinders, the compressor 170 of the illustrated embodiment has six cylinders and corresponding piston throws 171-176. It should be understood that the terms "throw" and "cylinder" are used interchangeably in regards to these descriptions as the illustrated example is a non-tandem construction. A tandem construction is a configuration where there could be more than one cylinder on the same throw.

For a better understanding of each cylinder 171-176 of compressor 170 in the preferred embodiment, refer briefly to FIG. 5, which shows the first cylinder 171 in the View Plane 5-5 designated in FIG. 1, four valve covers (also referrerd to as valve caps) 155-158 can be seen. Together with four other valve covers (not visible in FIG. 5) on the opposite (hidden) side of that first throw 171, has eight valve covers, which cover eight corresponding working valves of the corresponding throw. More particularly, for the first throw 171: the first valve cover 155 covers a first suction valve for that first throw 171; the second valve cover 156 covers a first discharge valve for that first throw 171; the third valve cover 157 covers a second suction valve for that throw 171; the fourth valve cover 158 covers a second discharge valve for that first throw 171; and there are four similar valve covers and corresponding suction and discharge valves on the opposite side of throw 171 (i.e., the side that is facing away from the point of view in the orientation of FIG. 5).

Although the plumbing between various cylinders 171 varies to achieve multiple stages as desired, and although other throws 172-176 of compressor 170 may vary slightly from the first throw 171, all six of the throws 171-176 have the same basic construction. It should also be recognized that the present invention is not limited to use in conjunction with compressors having six throws and/or four suction valves and four discharge valves per throw. For example, some commercially available compressors may be purchased with two, four, and/or six throws. In addition (depending on the configuration) the throw (cylinder) may have four, eight, twelve, and/or sixteen valves. Each throw of the compressor has multiple suction and discharge valves—often four of each per cylinder—and compressors are often also equipped with bypass valves for managing suction pressures, not to mention the valves and related controls for crank case lubrication, coolant circulation, and adjustment of displacement volumes, all of which could result in dozens of valves.

FIG. 1 additionally displays other components that are also included on skid 99, such as, a controller 120 for directly controlling engine 110. Also included, is a wired sensor array 180 for collecting operating data from numerous sensors mounted in and on compressor 170 and for communicating that data to the control panel 160 and beyond, plus a number of other modules 199.

Referring again to the general overview as illustrated in FIG. 1, the engine 110 may also be of any suitable make, so long as it is sized and adapted suitably for driving the compressor 170 and all required auxiliary devices on the skid such as the cooling fan. The engine controller 120 in the preferred embodiment is the typical ECM controller provided by the manufacturer of engine 110 or its supplier for controlling that type of engine 110 in these types of skid-mounted natural gas compression applications. Engine controller 120 is connected to engine 110 in a typical manner by a multi-conductor wire harness 111. For communication with other skid-mounted systems (i.e., other than the various portions of engine 110), controller 120 is connected by another multi-conductor lead 121 to an engine data gateway 130, which is typically provided by the engine's 110 manufacturer. As will be referenced further below, the network manager 130 is connected to interface with control panel 160 and its associated wireless gateway 510. In the illustrated embodiment, that connection to the control panel 160 and its wireless gateway 510 is preferably achieved using a Modbus RTU protocol transferred over an RS-485 lead 122.

Control panel 160 is connected to the other skid-mounted systems by means of various wire connections 122, 161, 162, & 163, all of which are multi-conductor cables (and/or harnesses) terminated with multi-pin connectors that mate with opposing connectors on the various skid-mounted subsystems 130, 180, 199, & 510, respectively. Control panel 160 is operatively adapted to display monitored data in an intuitively diagnostic manner through displays 165 & 166 while also wirelessly transmitting such data to remote back office services 150 through a wireless telemetry gateway 510. Some embodiments of displays 165 & 166 are touchscreens adapted or programed for display of InView data on screen.

Although not shown in detail in FIG. 1, various pipes, tanks, scrubbers and other associated pieces of equipment and related control modules 199 are also assembled and mounted on skid 99 together with compressor 170 so that it can achieve its principal function of compressing natural gas in a manner suited for storage in a tank and distribution through pipelines, as needed for the particular application.

With the exception of the remote back-office server 150, all components are operatively interconnected and mounted together as an interactive system on skid 99. Such mounting on skid 99 allows the entire assembly to be easily transported to and from the field location wherever it is needed for compressing the natural gas—either at or near the well site or somewhere in the natural gas collection and distribution pipeline network. Although skid 99 is only shown as a rectangular boundary in the drawing of FIG. 1, it should be understood as a conventional compressor skid by those skilled in the art.

Shown in the upper portion of FIG. 1 is a perspective view of the wireless gateway 510. Wireless gateway 510 has an outer cover 515 that is formed of hard, radio-translucent plastic and serves to protect electrical and other internal components of the wireless gateway 510. As viewed from above in illustrated operative orientation, the dimensions of cover 515 are preferably 8.10 inches long, 5.14 inches wide, and 2.76 inches tall (i.e., in the vertical direction), although other sizes are possible depending on particular implementations and requirements. Wireless telemetry gateway 510 principally serves to wirelessly transmit and receive data from skid 99 to and from back office data services 150 located remotely at another site. This preferably enables real-time or at least daily remote monitoring of compressor operation, so that a remote user can view much the same data as is displayed on control panel 160. This data stream includes actual skid measurements (i.e. pressure, temperature, and compressor rpm) as well as computed model-based equivalents. Such transmission is achieved in preferred embodiments through cellular or satellite data transmission, preferably using a logic circuit for automatic switching from one type of data transmission to another based on availability, cost and signal quality, to achieve Internet access.

Through the combination of components operatively linked, system 100 therefore includes a network of physical devices capable of communicating and sharing data with each other through various data ports and gateways. Networked in the manner illustrated, control panel 160 aggregates sensor data, translates between sensor protocols, processes that aggregated and translated sensor data and exchanges it through gateway 510 with remote back office servers 150 through the Internet cloud. In addition to the communication of aggregated and translated sensor data, control panel gateway 510 also enables receipt of controller updates as well as remote monitoring and diagnostics for the natural gas compression equipment on skid 99.

When operatively connected, wireless gateway 510 is sealed and is weather resistant, which is particularly advantageous when wireless gateway 510 is installed on top of a panel enclosure, the preferred mounting location within the disclosed system. There is also a weather resistant pole mountable option (not shown) for improving communication signal strength for remote locations. Wireless gateway 510 has a preferred operating temperature range between −40 and +85 degrees Celsius. The application subsystem of some embodiments of wireless gateway 510 has several features for improving performance and reliability including: high performance operation (with latency and interrupt response time sufficient to handle firmware requirements), 4 GB or more of non-volatile storage for snapshot event logging, parameter storage, event and diagnostic code storage, and software updates. Wireless gateway 510 also further has a large quantity of volatile random-access memory (RAM), at least having 1 GB RAM and preferably more.

Various software features of the compressor monitoring system 100 preferably enable the system to operate more efficiently. For instance, the wireless gateway 510 has multiple low-power operating modes. The compressor monitoring system 100 provides internal data logging including logging of a variety of operating parameters, diagnostics, and event snapshots. Additionally, the compressor monitoring system 100 can configure events to trigger data collection and data transmission such as compressor Diagnostic Trouble Code(s) (DTC) and parameter-based logical combinations.

A number of features in the compressor monitoring system 100 constitute improvements over existing systems. In addition to having unique software and electrical features, the compressor monitoring system 100 has various mechanical features. The device has a small package footprint, is sealed when mounted, and operates in extreme temperatures from −40° C. to +85° C.

Wireless gateway 510 also preferably meets a number of regulatory compliance certifications including, but not limited to, CSA Class 1 Division 2 (B,C,D) (North America)—T4, UCSA, and UL. Since wireless gateway 510 is ideally located in proximity to natural gas compression equipment, and given that natural gas is inherently volatile, the wireless gateway 510 is designed to be explosion proof in order to meet the CSA Class 1 Division 2 standard. Additionally, the wireless gateway 510 operates at low voltage and has sealed connectors, preferably using rubber grommets wrapped around the connectors to further enable a seal. Having sealed mechanical and electrical connectors further enables wireless gateway 510 to be spark resistant. In addition to being CSA Class 1 Division 2 compliant and shock proof, wireless gateway 510 is also IP67 compliant. IP67 compliance indicates that wireless gateway 510 is "level 6" dust proof and "level 7" waterproof (up to one meter immersion).

With regard to the wireless gateway 510, some embodiments of wireless gateway 510 have two 6-pin connectors (not shown) which enable connection to a compressor panel and RS-485 connections. Wireless gateway 510 also preferably has an RJ45 Ethernet socket connector (not shown). The ports for all such connectors are located in one or more recesses in the bottom, downwardly-oriented surface 516 of the housing 515 for gateway 510, with that recess being an upward recess that positions the ports well above the lowermost perimeter of gateway cover 515 to minimize if not eliminate the risk of exposing the connector ports to rain or other liquids.

Preferred embodiments include a wireless gateway 510 with one or more internal antennas in addition to internal shielding to shield its microprocessor from electromagnetic noise from internal antennas. Additionally, an external antenna adapter (not shown) may also be included on the bottom surface 516 of gateway 510 further enhance the data communication capabilities of the cellular, satellite, and GPS antennas.

The network manager 130 also connects to the wireless gateway 510, preferably using an Ethernet cable for engine data transfer. The wireless gateway 510 communicates with the remote servers 150 via either cellular or satellite transmission. Preferably, the wireless gateway 510 is adopted to communicated though one of at least two cellular connections available for the purpose of redundancy. For instance, one cellular connection can be programmed for data communication through cellular networks of a first cellular carrier (such as Verizon), while a second cellular connection can be programed for data communication though a cellular networks of a second cellular carrier (such as AT&T). If cellular connections fail or are unavailable, the wireless gateway 510 will attempt to connect via satellite transmission. In addition, the gateway 510, includes logic circuitry with algorithms for determining when to choose one option (cellular A, cellular B, or satellite) based on availability, cost, signal strength, and quality over the other options, and when to switch from one option to another. It is important to note that having two cellular connections and a satellite connection is unique to the field of natural gas compression control.

Since the network manager 130 communicates with the remote services back office 150 using the same cellular connection as the wireless gateway back office communication, the cellular service provided must support "split tunnel" functionality. The protocol utilized is TCP/IP. The wireless gateway 510 connects to the main module 181 and gathers compressor data using a CAN or Modbus connection 161. A separate RS-485 Modbus RTU customer port (not shown) is also preferably included to enable interface with any data management systems that a customer might desire.

Functional Features. The protocols and communication utilized in wireless gateway 510 include TCP/IP, Modbus RTU Master, Modbus RTU Slave, Modbus TCP, SMS messaging, and a Wi-Fi Access Point, as well as any custom protocols that might be requested or desired for particular manufacturer specifications. Security features may include data encryption capability and VPN cellular support. There are also configurable parameters for programming capabilities including: remotely configurable and via local utilities (such as alarm levels, post rates, etc.), remote and local firmware load (device flashing), and Over-the-Air ("OTA") programming of the data logging function.

A number of features and functionalities are incorporated to enable wireless gateway 510 to function within the particular make of engine 110. These features include: configurable Modbus registers for data from the engine controller 120, from the compressor monitoring modules 181, and other external devices; 1 Hertz external device data point capture rate; Low-power operating mode (Modem Power Control); and Internal event snapshot data logging, preferably enabling at least two simultaneous logs.

With respect to communications, a number of features are integrated within the disclosed system, including: Configurable Modbus maps, CAN-based SAE J1939 support; OTA software updates for wireless gateway 510, compressor monitoring modules 181, 183, 185, and EICS equipped engine controllers; OTA configuration updates for wireless gateway 510; an on-board webserver for parameter setting and data viewing; OTA parameter configuration (including Modbus maps); Automatic Communication type switching (Cellular to Satellite being the best path); and Variable Data Post Rates for each data point with Cellular/Satellite selectability (one rate for Cellular and another rate for Satellite).

With respect to monitoring a gas compression system, the disclosed system 100 preferably incorporates a number of features, including: a Robust Alarm ("RBE") mechanism including dead-bands, de-bounce, and formula based suppression, on board alarm dead-bands, de-bounce, and shutdown suppression; Implied Decimal support for post data; High-high, high, low, and low-low alarm settings on each reading; Greater Than or Equal and Less Than or Equal alarm settings on each reading, change of state alarms functionality; Slope and Offset Adjustments on all readings that allows conversions of raw readings to engineering units, programmable host server IP address and port (for data posting connections), the ability to mark individual data point samples as invalid, de-bounce (delay) and hysteresis on all alarm levels, individual alarm enable/disable that allows alarms to be turned on and off without affecting the alarm level settings, ability to read and write to registers in Murphy panels, allow 0 posting rate groups (RBE only), programmable serial port parameters (Baud Rate, # Data Bits, Parity, # Stop Bits), Event and Diagnostic Code Support via the engine data gateway 130 and the EICS, Public and Proprietary J1939 support, GPS information transferrable to network manager 130, additional data gathered from the Compressor Manufacturer's pre-installed sensors (through data line 192), Ethernet Pass-Through for Remote Services, Ethernet Modbus TCP support when not used for remote services, SMS "Shoulder Tap" mechanism, support for any other protocols that may be specified, Flexible Demand Polling on an individual or grouped data point basis, alarm trigger operations for local control applications (within control panel 160), message buffer (up to 500 messages) that prevents data loss due to communications interruptions, after communications interruptions data transmitted in the order of their occurrence, remote retrieval of data logs (configurable to limit file size, data cost and transfer time), event and diagnostic code support for CDL and J1939 (via the engine data gateway 130), ability to pack multiple digital values in a single data point, compressor panel power loss detection, password protected local access, and remote access to control panel 160.

Hardware Features. There are numerous hardware features for the disclosed system 100. For engine coordination using wireless gateway 510, CAN and J1939 communication is enabled. For compressor coordination, any number of compressor panels may incorporate use of wireless gateway 510. One particular example for control panel 160 is the Centurion® Lite Murphy Compressor Panel which is commercially available from Applicant (shown in FIG. 1) which has minimum digital inputs including, but not limited to: Emergency stop, Remote Emergency Stop, Lubricator No-flow LB, Lubricator No-flow RB, Engine Oil Level, Compressor Oil Level, Jacket Water Level, Auxiliary Water Level, Fuel Gas Scrubber, $1^{st}$ Stage Scrubber Level, $^{nd}$ Stage Scrubber Level, $3^{rd}$ Stage Scrubber Level, $4^{th}$ Stage Scrubber Level, Engine Vibration, Compressor Vibration, Cooler Vibration, and at least one spare input for any custom device inputs as may be desired.

There are several hardware features related to modem data communications. For cellular communications, there is selectable support for 4G LTE Verizon, 4G LTE AT&T Networks including KORE, with 3G GSM as a fallback. The satellite communications are conducted through Iridium Communications. There is also a Wi-Fi access point and a GPS for location support.

Wi-Fi and On-Board Webserver. For the onboard webserver (not shown), the wireless gateway 510 setup parameters, such as server IP address and port and version information, are available through HTML pages that can be accessed via a built-in Wi-Fi connection. JavaScript Object Notation ("JSON") configuration files are not downloaded using the webserver but instead are done OTA so the server is in sync with the wireless gateway 510. The webserver interface eliminates the need for Windows PC-based support software. The Wi-Fi connection is used by local service personnel to view, and in some cases, modify information in the wireless gateway 510.

Remote Engine Support. In addition to control panel access and compressor data exchanges, gateway 510 also enables remote support of engine 100 through engine data gateway 130. While the engine data gateway 130 does not have direct access to the Internet, software is included in the control panel 160 and its wireless Internet gateway 510 to pass a message from the engine manufacturer's remote servers to the engine data gateway 130 indicating that a remote service session is being requested. Once such a request is received, the engine controller 120 and its gateway 130 then initiate a session with the engine manufacturer's remote servers through the control panel gateway 510 and, when desired, the engine manufacturer can update or replace the engine controller 120 during such sessions. To facilitate all this, the wireless gateway 510 provides an Internet connection to the engine data gateway 130 via an Ethernet port of wireless gateway 510. The wireless gateway 510 also passes GPS information to the engine data gateway 130 so engine controller 120 can properly identify itself to the engine manufacturer's server once it makes a connection. The mechanism currently defined for letting the wireless gateway 510 know that a remote services session is being requested is for the server to send the wireless gateway 510 a Short Message Service ("SMS") message. This is referred to as the SMS "Shoulder Tap" mechanism.

E&D Support. The wireless gateway 510 provides event and diagnostic support using codes obtained from different engine controllers. For engines with EIS and ADEM III or newer engine controllers, Event and Diagnostic ("E&D") codes are obtained from the engine data gateway 130. If a Murphy EICS engine controller is used instead, then E&D information is extracted from that.

The E&D mechanism is defined for other hardware devices, and from the server's point of view the data exchange should be the same. In this context, there may be up to seven E&D Units. Only one unit is supported in the wireless gateway 510. E&D codes from the EICS should be sent in as close to the same format as those obtained from the engine data gateway 130.

Compressor Panel Power Loss Detection. The wireless gateway 510 also has features for compressor panel power loss detection. If compressor panel power is lost but not wireless gateway 510 power, the wireless gateway 510 will detect that condition and report it. The wireless gateway 510 will stop the scheduled posts except for a once a day notice that the condition still exists. When power is restored to the panel, operation will begin as normal. If power is lost to the wireless gateway 510, it will shut down until power is restored, after which it will start normal operation.

Remote Access. Preferably, the wireless gateway 510 has additional features such as an Ethernet port, Remote Centurion Access, and Remote External Device Access. The Ethernet port serves as a data connection to connect gateway 510 to the rest of compressor monitoring system 100, in part to provide an internet connection for the engine data gateway 130. When not used for remote services, the Ethernet port of gateway 510 can be configured to support Modbus TCP for additional external device support. For Remote Centurion Access, any change that can currently be made to the Centurion compressor panel locally, such as changing set points for kills, can be done remotely, whether that is done manually or automated through a user interface. Program changes to the Centurion compressor panel can be done locally or remotely. For Remote External Device Access, remote devices are accessed through control messages sent by the back office servers 150 to system 100 through wireless gateway 510.

Figure 2:
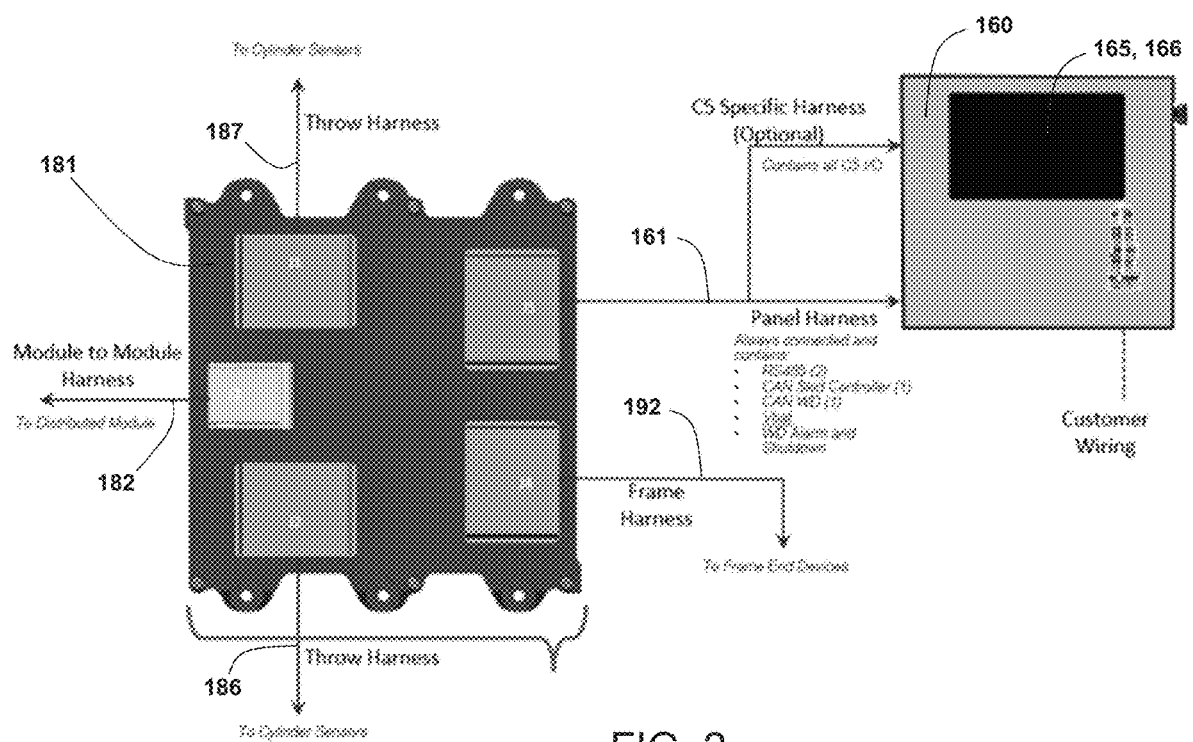

Turning now to FIG. 2, which shows a more detailed view of a base compressor monitoring module 181 mounted on compressor 170. Base compressor monitoring module 181 serves to enable connection of numerous components of the system 100 shown in FIG. 1. Connection is made to a second monitoring module 183 by module to module harness 182. It should be understood, particularly with reference to FIG. 1, that monitoring module 183 is similarly connected to a third monitoring module 185. Connection to cylinders 171 & 172 is made by throw harnesses 186 & 187. Frame harness 192 connects compressor monitoring module 181 to frame end devices. Panel harness 161 (or optional C5 specific harness) is used to connect compressor monitoring module 181 to the control panel 160.

Figure 3A:
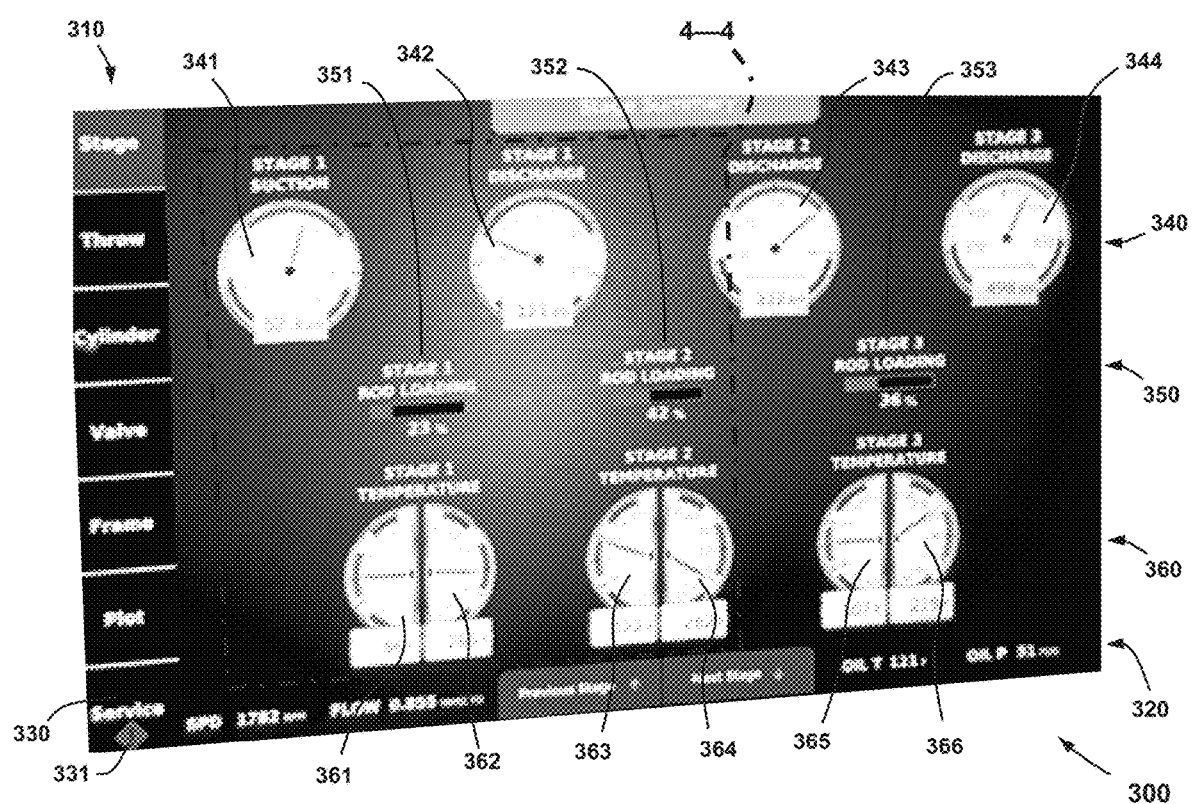

Graphic Interface Layout. Turning now to FIG. 3A, which shows a sample screen shot 300 displayed during operation of the skid-mounted monitoring system 100 of a preferred embodiment, the screen shot 300 being an example of the information displayed on the lower screen 166 of control panel 160 shown in FIG. 1.

Shown in FIG. 3A is display of a real time graphical user interface having a menu of selectable functionalities and graphical representations of instruments displaying real-time condition measurements as recorded by a remotely located compressor panel 160. With cross-reference to FIG. 1, wireless gateway 510 transfers real-time condition measurements via cellular or satellite to remote servers 150 that are likely controlled by the equipment manufacturers or their delegates. The remote servers 150 are preferably adapted with similar software as the graphic interface software of control panel 160 such that users at remote sites connected to the remote servers 150 can also have graphical user interfaces like those shown in FIGS. 3B & 4.

Specifically, in FIG. 3A, an example of a "Stage" screen 310 is shown, i.e., an image that is displayed on screen 166 of control panel 160 when a user selects the "Stage" option. In that view, the top row 340 of gauges 341-344 are pressure gauges arranged progressively in sequence from left to right, with the furthest left 341 preferably being the lowest pressure of the displayed pressures, which corresponds with the Suction side of the first stage of compressor 170.

Preferably in a row 360 beneath (or alternatively above) or beside in alternatives, the pressure gauges 341-344 are optimally centered temperature gauges 361-366. Temperature gauges 361-366 are positioned in a manner that visually corresponds with progression through compressor 170, mirroring the same progression as the pressure gauges 341-344. Between the pressure gauges 361-366 and temperature gauges 361-366, rod loading gauges 351-353 are shown for the corresponding stages in the middle row 350. Rod load horizontal bar graphs 351-353 are displayed as a percentage calculated from the measured pressures in combination with other variables (i.e. compressor geometry, compressor configuration, and gas composition), and computed according to conventional techniques/engineering rod load models.

It should be understood that FIG. 3A merely illustrates one non-limiting example of a display set-up on the GUI, particularly for three-stage compression. For example, the number of gauges will be dependent on the number of instruments being remotely monitored. It is contemplated that the system may include from one to six stages of compression. Those skilled in the art would understand that alternative configurations would achieve the same objective of intuitively displays of pressure and temperature in multiple stages. For example, the reverse orientation may be used and have the temperature gauges on the top row. Or, as an alternative columns could be used rather than rows.

With respect to the instruments displayed within the "Stage" 310 screen, each gauge 341 represents real-time measurements of a particular valve stage. As shown, there are two Stage 1 pressure gauges 341 & 342, one monitoring suction pressure 341 and one monitoring discharge pressure 342. There is one pressure gauge shown for Stage 2 343 and one for Stage 3 344. Each of those pressure gauges 343 & 344 monitoring discharge pressures. Each of Stages 1-3 further have a representative temperature gauge 361-366. Each temperature gauge 361-366 is split vertically into a left half 361 and a right half 362. Each left half of the temperature gauges 361, 363, 365 monitors suction temperature, and each right half 362, 364, 366 monitors discharge temperature. The readouts on the gauges will be discussed in more detail below with respect to FIGS. 3A, 3B and 4.

Including the "Stage" menu 310 in FIG. 3A, a total of seven selectable items are shown. The second selectable feature in the menu list is a "Throw" menu. The Throw menu will be similar to the Stage menu, particularly monitoring and displaying throw parameters such as suction pressure, discharge pressure, suction temperature, discharge temperature, and also rod loading. Other menu selections include a "Cylinder" menu, a "Valve" menu, a "Frame" menu, a "Plot" menu, and a "Service" menu 330.

Each of the "Cylinder", "Valve", and "Frame" menus will monitor and display particular parameters pertaining to each of those components of the system. With respect to the "Valve" menu, the gas pressure at the valve head may be measured. Another measurement may be the temperature of the valve head itself. Selecting the "Plot" menu will display a plot of the data, with the additional functionality of allowing a user to plot the data as a function of day, week, month, or quarter for all the different parameters. The "Service" menu 330 includes diagnostic measurements, status of the system, and the like. A symbol or indicator 331 will appear under the "Service" menu if there is an issue with the system that requires maintenance or attention. An additional feature under the Service menu may be a password-protected feature that allows an authorized user access to programming all the different items.

It is contemplated that the display 166 will be mounted in the compressor control panel 160. For communication between the display and the wireless gateway 510, there is a long wire harness connecting the two. It is further contemplated that the wireless gateway 510 will be mounted on top of the compressor panel. Wireless gateway 510 is able to send the collected data to the remotely located back office 150. A remote user may then be able to view the remote diagnostic data using a virtual display. Importantly, included in the data sent off-site from the disclosed system is the present operating condition of the compressor. Since the system may not be consistently monitored throughout operation, knowing the current operating condition of the system is valuable given that any problems may be detected quickly and resolved as soon as possible, limiting down time.

Figure 3B:
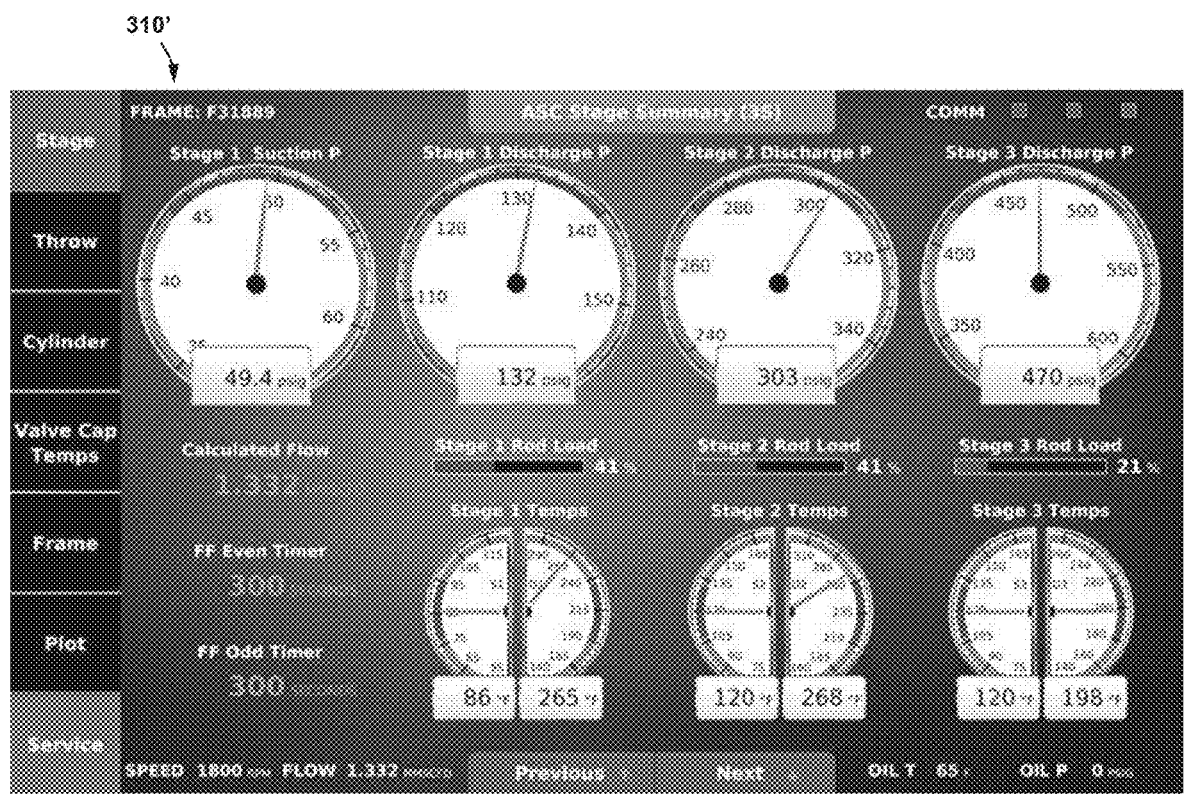

FIG. 3B shows one non-limiting example of an alternative screen display 310' having many of the same characteristics and serving much the same purposes as the sample screen shot 300 shown in FIG. 3A.

Figure 4:
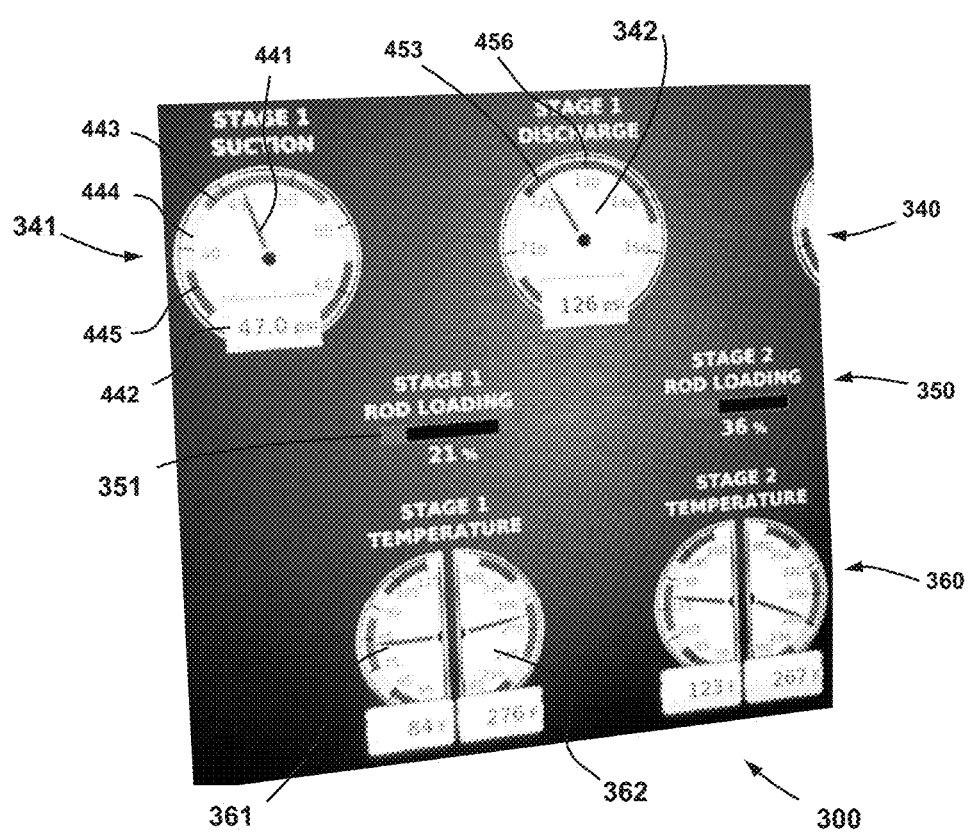

Turning now to FIG. 4, shown is a more detailed view of some of the "soft" gauges 341-342 & 361-362 displaying real-time operational parameters, as appearing in the portion 4-4 of the display 300 shown in FIG. 3A.

Split-Stage, Optimally-Centered, Soft Temperature Gauges. For visual efficiency, the monitored data is displayed intuitively through "soft" digital gauges 341. Gauges 341 are described as "soft", due to the strategy of varying the scale of the gauge face, preferably continuously and preferably in at least one (or both) of two respects: (i) first by safe-centering the scale display to values for optimal operation; and (ii) by color coding at least the safe or unsafe ranges of the gauge based on current operating parameters. The "soft" nature of the gauges 341 allows the user to quickly and intuitively determine if there is an issue with any component in the system 100 that requires attention.

Preferably, the color-coded indicators on each gauge 341 include a green zone 443, a yellow zone 444, and a red zone 445. The green zone 443 is variable and based on the optimal range of values based on the various known inputs, conditions, and settings under which the compressor 170 is currently operating. For each digital soft gauge, the center of the green zone 443 represents the optimal value for that particular sensed condition according to the engineering model. The yellow zone 444 indicates a range of values just above the uppermost limit and below the lowermost limit of the green zone 443, i.e., outside of the model performance accuracy range. One or more readings within the yellow zone 444 may indicate a problem with the compressor, for example, a valve leak or some other malfunction. For example, temperature gauge 366 in FIG. 3A, is showing a temperature in the yellow zone 444 and may indicate an issue requiring attention. Or even more alarming, the red zone 443 of a gauge represents a range that is further outside the model accuracy, including a range outside the uppermost and lowermost limits of the yellow zone 444.

To illustrate the "soft" nature of the gauges, in FIG. 4, gauge 361 shows a current reading of approximately 86 degrees F., while gauge 362 displays approximately 290 degrees F. Both of these values are displayed as operating within their respective green zones. Similarly, suction valve pressure gauge 341 displays a value of 47.0 psi 442, operating within the green zone 443. Similarly, the corresponding discharge valve pressure gauge 342 has a value of 126 psi, operating within the variable green zone 453. Merely observing that the gauge needle 441, which represents the actual value of the sensed condition during operation, is within the green zone 443 will allow the operator to intuitively determine that the respective valves are safely operating within their optimal ranges, even without having to know the actual sensed value.

Figure 5A:
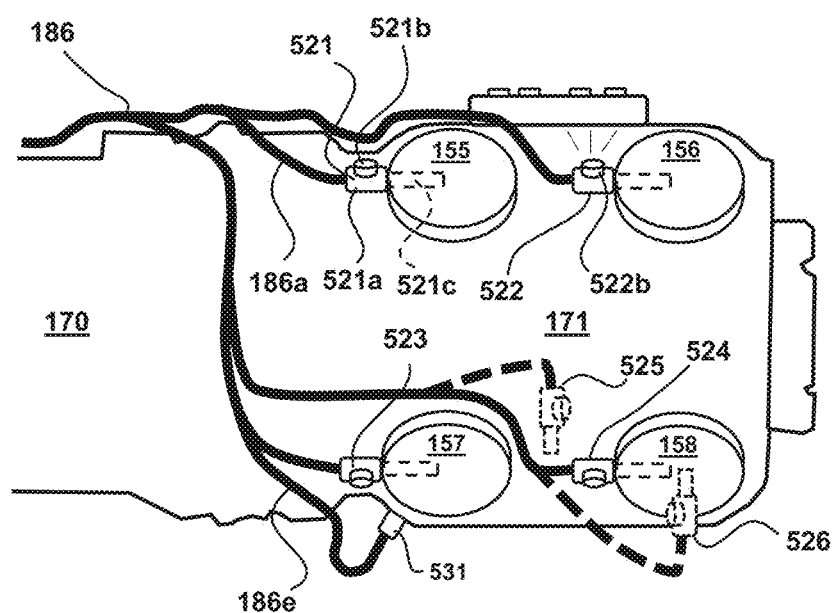
FIG. 5C shows a sample screen shot of a Valve Cap Temps screen displayed during operation of the skid-mounted monitoring system.

Turning to FIG. 5A, which shows the first cylinder 171 of compressor 170 in the View Plane 5-5 designated in FIG. 1.

As described briefly above, four valve covers 155-158 can be seen, together with four other valve covers (not visible in FIG. 5A) on the opposite (hidden) side of that first throw 171. Each valve has an interior plate and a plurality of springs which actuate the movement of the plate open and closed. More particularly, for the throw 171: the first valve cover 155 covers a first suction valve for that first throw 171; the second valve cover 156 covers a first discharge valve for that first throw 171; the third valve cover 157 covers a second suction valve for that throw 171; the fourth valve cover 158 covers a second discharge valve for that first throw 171; and there are four similar valve covers and corresponding suction and discharge valves on the opposite side of throw 171 (i.e., the side that is facing away from the point of view in the orientation of FIG. 5A).

Although the plumbing between various cylinders varies to achieve multiple stages as desired, and although other throws 172-176 of compressor 170 may vary slightly from the first throw 171 in other ways that are well known in the art, all six of the throws 171-176 have the same basic construction. Again, though, it should be recognized that the present invention is not limited to use in conjunction with compressors having six throws and/or four suction valves and four discharge valves per throw.

Associated with each valve is a thermowell or temperature sensor 521-524, preferably a resistance temperature sensor, and pressure monitoring devices 531. It should be understood that the pressure monitoring device 531 is displayed in FIG. 5A only to be shown as separate from the thermowells 521-524, and several pressure monitoring devices 531 could be situated in many other locations. Similarly, the engine 110 may contain multiple thermowells 521 and multiple pressure monitoring devices 531. Furthermore, thermowell 525, shown in dashed line, is an alternate placement for a thermowell for monitoring the temperature in close proximity to valve covers 157 and 158. Other thermowells may be positioned similarly to the position of thermowell 525, i.e., in close proximity to other valve caps (and their corresponding valves) located on compressor 170. In other embodiments, a thermowell may be positioned approximately in the middle of the valve cap, particularly as shown with reference to the placement of thermowell 526 in valve cap 158. Placement of the thermowells 521-526 as illustrated is in contrast to at least some prior systems, wherein the illustrated placement is much closer to the flow of gas through each valve than has been observed in prior systems. Rather than installing the thermowell through the side of the valve cap as shown, another alternate position for placement of a thermowell is through the center of the face of the valve cap such that the thermowell enters the valve cap in an orientation perpendicular to the valve cap face, such as the placement of thermowell 526 in valve cap 158 illustrated in FIG. 5A.

Preferred embodiments use PXT-K Series Pressure Transmitters 531 ("PXT-K"), which are pressure monitoring devices that can be used in applications such as compressors, engines, process control, liquid level, and pumps in the disclosed system. Each piezoresistive pressure transmitter 531 contains a transducer comprised of a piezoresistive silicon chip mounted on a glass-metal feed-through header welded into a stainless-steel housing and filled with silicone oil. There are several inputs for pressure transducers 531 (PXT-K's in the preferred embodiment) including, but not limited to: Engine Oil Pressure, Compressor Oil Pressure, Suction Pressure $1^{st}$ Stage Discharge Pressure, $2^{nd}$ Stage Discharge Pressure, $3^{rd}$ Stage Discharge Pressure, and $4^{th}$ Stage Discharge Pressure.

Preferably, each thermowell 521 has four wires, two of which terminate and electrically connect to a chip (not shown) which makes the temperature measurements. The other two wires electrically connect to a printed circuit board (PCB) 521a having a light emitting diode (LED) 521b mounted thereon along with necessary electrical componentry for powering the LED 521b. The LED 521b and PCB 521a are preferably mounted on a surface of the valve cover. Thermowell 521 is connected to the valve cover 155 by an attached probe 521c that is inserted in a bore into the valve cover. To ensure thermal conductivity between the valve cover 155 and thermowell sensor 521, the probe 521c is covered in a temperature conductive material before insertion. The chip measures the resistance at the thermowell 521, and when one or more parameters are out of tolerance, the display sends a signal to the chip which in turn sends a voltage that causes the LED 521b to emit light. Those who are skilled in the art will understand that other alternative embodiments will accomplish many of the same purposes of thermowell 521 that is shown in FIG. 5A. In one example, the LED 521b is integrated with an electrical connector some length from the actual thermowell 521 as part of a translucent connector or housing which also serves as a connector to a wire harness.

To illustrate this concept, a normal operating voltage is typically less than 5 volts, and at this voltage, in essence the LED 521b is like an open circuit such that the normal operating voltage is not enough to power the LED 521b. In order to power the LED 521b, the voltage is increased. As those skilled in the art would know, this is done quickly because the thermowell 521 is used to measure the temperature. So, if the voltage is increased for too long a period, this will induce heat.

This additional heat can distort (increase) the readings of the temperature sensor 521 if the voltage is increased for too long of a time period. Thus, when the LED 521b is lit, this signals that there is a potential issue with the operation of its associated valve. Operators can then easily identify the location of concern locally. If the temperature is too high or too low, and outside the predetermined threshold, the wireless gateway 510 will communicate a signal to the engine 110.

Real-Time Diagnostics. Analysis of monitored compressor 170 data is analyzed continuously, on a real-time basis, by automatically evaluating real-time sensor data in comparison to engineering models for the compressor's 170 operation. In part, this automatic evaluation involves mathematical extrapolation of the temperature and pressure data from similarly situated valves in the system as well as engine speed to determine piston rod loads for the piston rod in each cylinder. Other factors evaluated to determine if maintenance is required, includes deviations of current values from expected theoretical values calculated from known conditions. These include characteristics of natural gas such as mass flow rate, and enthalpy changes during operation. In addition, the real-time data evaluates the dynamic pressures and temperatures during the compression cycle to determine whether one or more of the suction or discharge valves is likely to require maintenance and, if so, to indicate as much to a user of the skid-mounted monitoring system 100. As part of such determination, if it is determined that one or more of the suction valves on a particular cylinder 171 must be either obstructed or worn to the point of leaking, the base compressor monitoring module 181 then narrows down to which of that cylinder's multiple suction or discharge valves is in greatest need of attention.

Preferred embodiments utilize a valve leak index, using a number of flags or indicators, to not only determine which valve is leaking, but also to ultimately enable the system to signal to an operator the particular problematic valve. Each of the flags or indicators represents a sensed condition such as valve cap temperatures, cylinder temperatures, and fluid flow rates. Each of the flags or indicators is assigned a number between 0 and 1.2 based on the sensed value of the particular indicator. For detecting a valve leak, each of the assigned values for each of the flags or indicators are determined and then multiplied together, and the product of that multiplication calculation is the determining factor as to whether there is a leak in a particular valve. If the product of the calculation is greater than 1.0, this indicates a valve leak.

Prior systems have been known to consider only one sensed condition, e.g., valve cap temperature readings, for alerting an operator that there is a possible valve leak. However, consideration of only one value of a sensed condition, such as one of the flags or indicators given in the table above, could likely lead to a false failure alert, i.e., an indication of a valve leak when there is no such leak. A false indication of a leak could then likely result in unnecessary and potentially costly downtime for the compressor. It is the consideration of these multiple flags or indicators together that significantly reduces the likelihood of a false indication of a valve leak. As an example, taking into account only one flag or indicator, such as a high temperature reading at the valve cap for a suction valve, particularly when the reading is a significant departure from the expected or engineering model, could lead one to believe that a valve leak is occurring. However, experimental data by the Applicant has shown that relying only on an out-of-range valve cap temperature can possibly lead to a false alert.

As indicated, several sensed condition readings can be used to determine whether there is a leak somewhere in or even outside the compressor. This leak may be a valve leak, a piston ring leak, or a leak in piping that is external to the compressor. It should be understood that during operation there may be more than one leak occurring simultaneously. The system and methods described herein are capable of predicting where such leaks are occurring in real time.

Regardless of the particular diagnostic logic and corresponding algorithms, once it is determined that a particular valve is likely to require maintenance, the corresponding compressor monitoring module 181 then directs a signal to that valve to cause the connector LED 522b on the valve assembly to be illuminated, as a signal that maintenance is needed on the valve under the valve cover with the illuminated LED 522b.

This concept is illustrated in FIG. 5A, a valve leak is detected by the valve leak algorithm in the valve located where thermowell 522 is installed (valve cover 156). The LED 522b, which is part of temperature sensor assembly 522 is depicted as being illuminated. This indicates to a user that the working valve under valve cover 156 may require maintenance, while the LEDs on the three other temperature sensor assemblies 521, 523 and 524 are not illuminated. Additionally, a symbol or indicator 331 will appear on the display 165 of the control panel 160 under the "Service" section 330, as seen in FIG. 3A. The "Service" option 330 can then be selected to receive further information regarding the symbol or indicator 331.

Figure 5B:
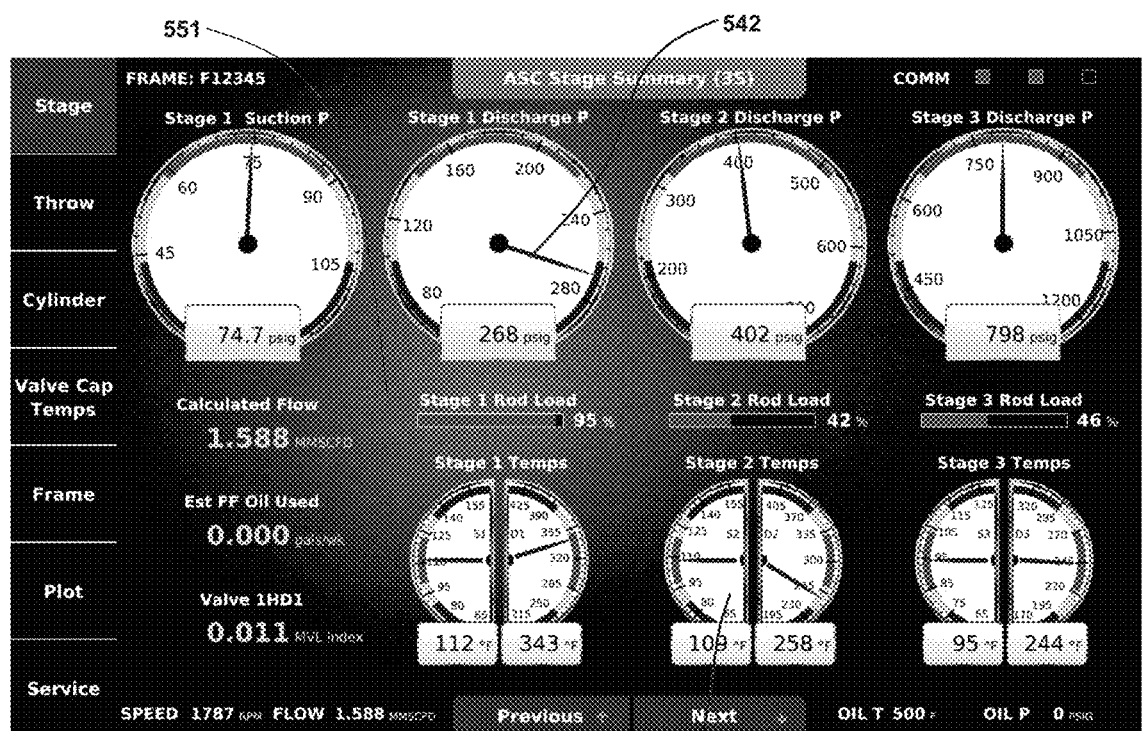

Turning now to FIG. 5B, there is shown a screen shot similar to the representation in FIG. 3A. However, FIG. 5B shows a situation that indicates a potential valve leak. Particularly, the Stage 1 Discharge Pressure 542 is indicated to be in the unsafe (or red) range with a reading of 268 psig. Furthermore, the Stage 2 Suction Valve Temperature gauge 564 indicates a sensed reading for the suction valve temperature in Stage 2 that is outside of the safe (green) range on the soft gauge, where the reading falls within the marginal (yellow) range. However, even though these reading suggest a possible valve leak, these readings alone may not reliably indicate such a leak and may even represent a false indication of a valve leak.

Figure 5C:
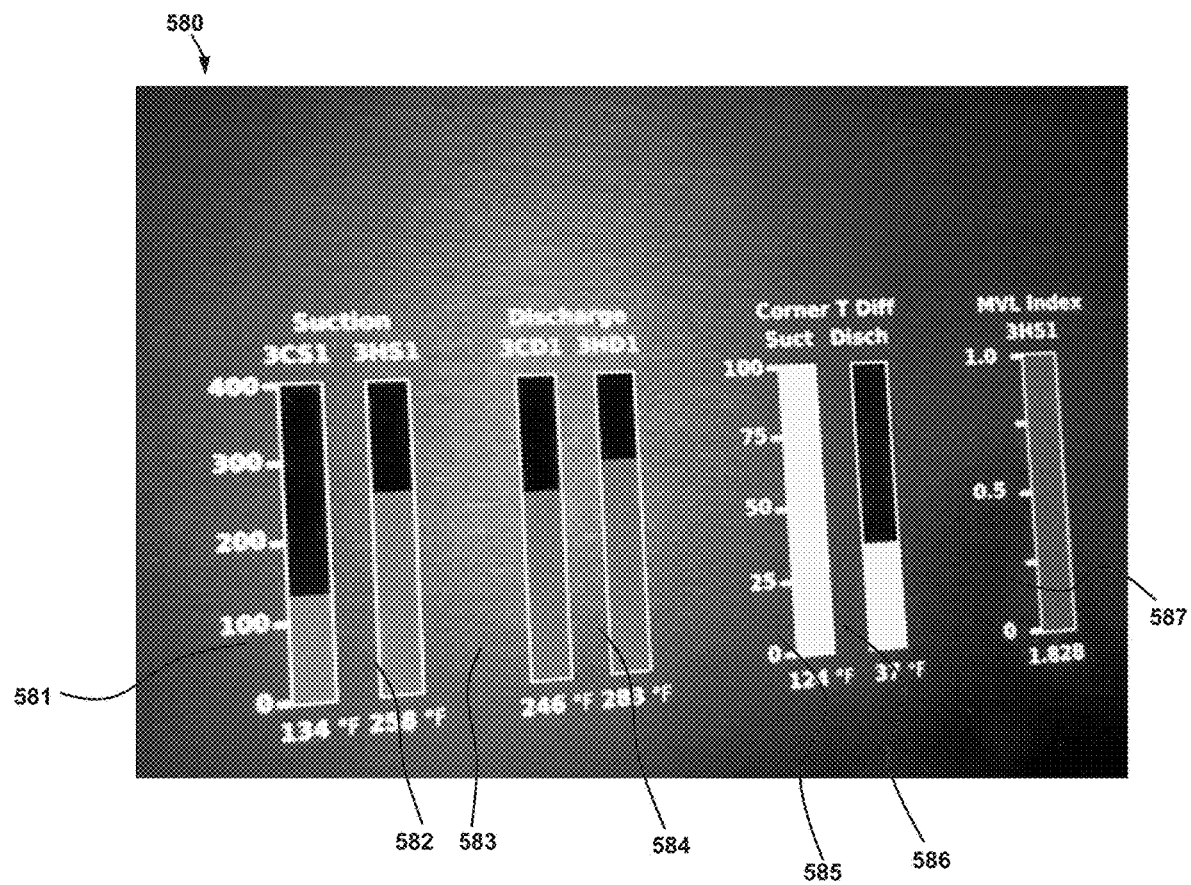

Turning to FIG. 5C, shown is a screen shot of a Valve Cap Temps screen 580. The representative screen 580 has touch-screen capability, and as shown in FIG. 5B, there are a number of other menu screens appearing vertically on the far left side of the display, such that touching a menu icon will present a view of information related to the particular system component on the display. For example, pressing on the Valve Cap Temps icon brings up the view shown in FIG. 5C. Although not shown in FIG. 5C, the user interface may include scroll arrows on the display in order to allow an operator to scroll through the valve cap temperature readings in other throws on the compressor.

As particularly shown in FIG. 5C, starting from the left side of the display, there are seven vertical bar graphs that represent the following condition measurements in one throw: two graphs 581, 582 showing temperatures readings of the suction valves associated with the particular throw; two graphs 583, 584 showing temperature readings of the discharge valves associated with the particular throw; two graphs 585, 586 displaying the temperature difference (or ΔT) between each suction valve associated with the particular throw and the temperature difference (or ΔT) between each discharge valve associated with the particular throw; and a graph 587 displaying the value obtained by running the valve leak algorithm as described above.

Each of the suction and discharge valve temperatures 581-584 are shown to be within an acceptable range based on the engineering model given that the readings are displayed in green. These temperature readings alone are not indicative of a problem. The temperature difference 585 between the suction valves and the temperature difference 586 between the discharge valves are displayed in yellow, indicating that the temperature differences 585, 586 are outside of the acceptable range based on the engineering model. Again, these temperature differences 585, 586 alone are not necessarily indicative of a valve leak but do suggest further inquiry may be appropriate. However, when these real-time temperature readings 581-584 are considered and applied in the context of the valve leak detection algorithm described above, wherein other factors are used to determine the present operating condition of the compressor, the system 100 indicates a present valve leak. The present valve leak is indicated in at least two distinct ways: 1) the valve leak index result 587 is displayed in red in the vertical bar graph representation, wherein the red color-coding indicates that the operating conditions are well outside the optimal readings based on the engineering model; and 2) the numerical result of the calculations used in the valve leak algorithm indicates a value of 1.828, which is well above the 1.0 value that is indicative of a valve leak. It should be understood based on the present disclosure that once a leak has been detected as described herein, a physical alert represented by the flashing of an LED 521 at the location of the leak will signal to an operator which valve is leaking.

One of the distinct advantages of the presently disclosed embodiments is that when a problem does arise during operation of the compressor, such as a valve leak, an operator is alerted by the system regarding which valve(s) are problematic and requires urgent attention. Strictly observing temperature and/or pressure readings does not always intuitively indicate a problematic valve. Taking FIGS. 5B and 5C as an example of this, the display shown in FIG. 5B indicates that the Stage 1 Discharge Pressure reading 542 is significantly out of range as compared to the model, such that the reading is in the red zone on the soft gauge. Furthermore, the Stage 1 Rod Load reading 551 is shown to be more than twice the rod load readings for Stage 2 and Stage 3. Also, the Stage 2 discharge valve temperature reading 564 is outside the acceptable range based on the model such that the temperature reading is in the yellow zone. Given that the most out-of-range condition reading occurs with respect to a temperature measurement in Stage 1, one might assume that the valve leak is occurring in Stage 1. However, as evidenced by the Valve Cap Summary display 580 shown in FIG. 5C, the leak is occurring in a Stage 3 valve. The out-of-range readings in the other stages actually result from those stages having to work harder in order to compensate for the leak in the Stage 3 valve.

Another aspect of the leak detection concept is that the evaluation of the data points related to sensed conditions can be done over a 24-hour period. During any 24-hour period, ambient temperatures will vary, and as a result, the digital soft gauge readings will also vary over the same time period such that pressure measurements, particularly suction valve pressures, will likely fluctuate. By processing the sensor data over a 24-hour period, with fluctuating ambient temperatures and different operating conditions overall, the disclosed system can better evaluate the operating conditions with respect to anomalies such as the various types of leaks discussed herein. Furthermore, the data set of sensor readings is much larger over an extended period in contrast to observing particular sensor readings at one point in time. This larger data set can help better capture the operating conditions of the compressor and may also help determine whether out-of-range temperature and/or pressure measurements are truly indicative of a problem or whether such measurements are anomalous, perhaps being caused be external conditions.

Whether diagnostics are run over a 24-hour period or a shorter period, in some embodiments, a non-linear solver or Artificial Intelligence (AI) engine may be employed for detecting leaks such as valve leaks, piston ring leaks, leaks around the packing, leaks in process piping, etc. An AI engine is adapted to receive the data set containing the various sensor data related to parameters such as valve cap temperatures, suction valve pressures, discharge valve pressures, and the like. Alternatively, the AI engine may be applied to the needle positions on the various soft gauges relative to the ideal needle position, typically at the 12 o'clock position on the dial, as determined by the engineering model. The AI engine preferably employs a non-linear curve fit to the sensor data points or needle positions on the digital soft gauges. In turn, the AI engine generates an algorithm for determining whether a leak is occurring and where that leak is occurring with respect to the various compressor components.

Another factor related to the diagnostics is to consider user inputs. There are a range of user inputs that can skew the operational data relative to the engineering model. For example, in some compressor applications, one user input may be gas composition. If the entered gas composition is inaccurate, this may lead to one or more out-of-range readings of pressures and/or temperatures that normally might signal an operational problem with the compressor. Also, if the initial setup of the compressor in the field is not completed according to the compressor specifications, this may also result in pressure and/or temperature readings that are out of line with respect to the engineering model. It is anticipated that such factors may be considered in the diagnosis of potential problems during compressor operations.

Figure 6:
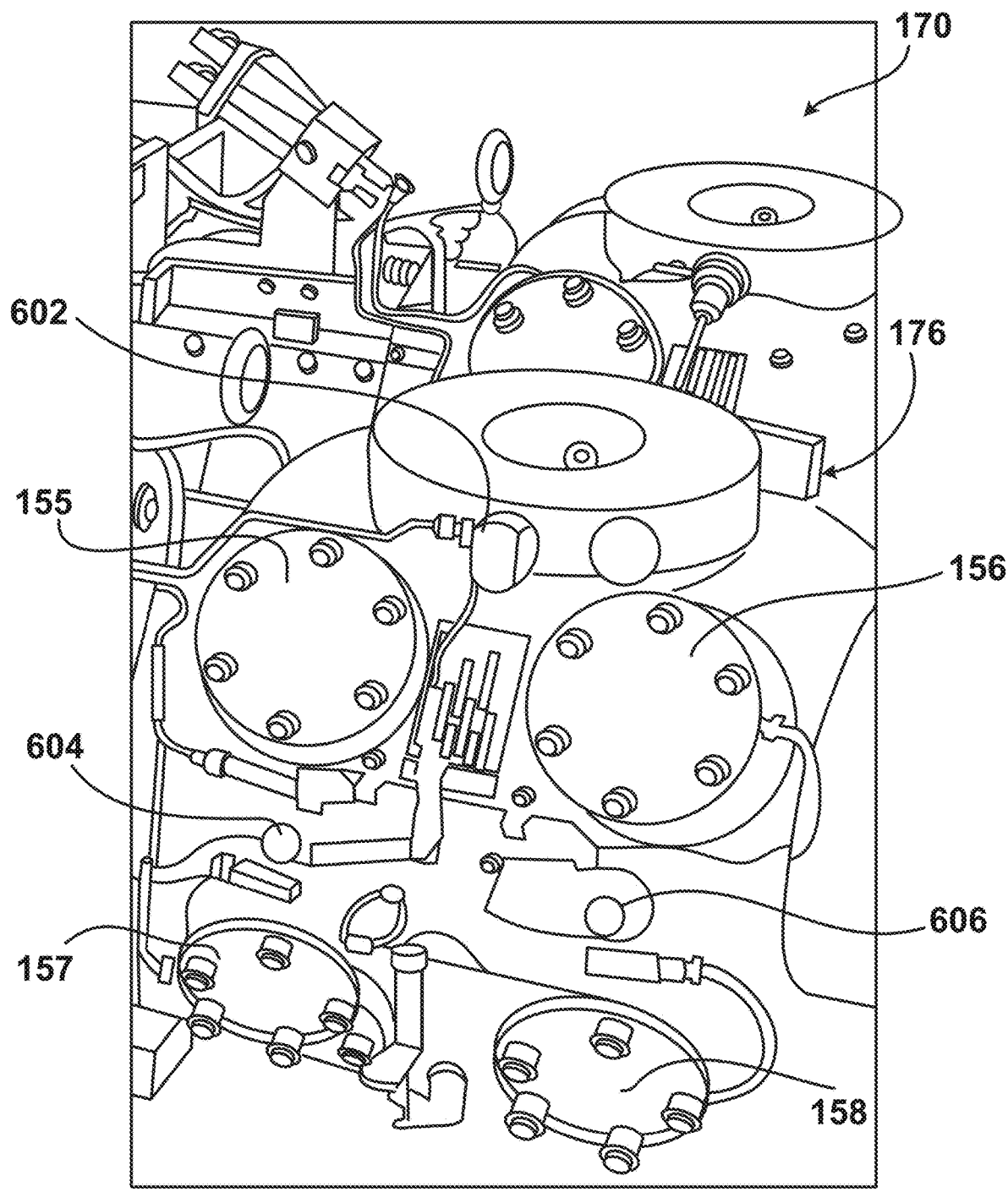
FIG. 6 illustrates a view of throw 176, further illustrating alternative positions on the throw for installing a combination Pressure, Vibration, and Temperature (PVT) sensor.

Looking now at FIG. 6, there is shown a partial isometric view of compressor 170, and more particularly a closer view of throw 176. Four valve caps 155-158 are shown in this view. First, in some prior compressor systems, vibration detection is typically performed only on an ad hoc or intermittent basis using temporarily placed vibration sensors, typically attached to the compressor using magnets. Second, many times such vibration sensors are positioned closer to the crankcase associated with the compressor. In contrast to these principles, disclosed embodiments propose to include on-board sensors, particularly sensors that measure pressure, temperature, and vibration as one unit. This description refers to such combination sensors as PVT sensors. The pressure and temperature sensing capabilities can be performed using pressure and temperature sensors as already described herein. It is contemplated that for measuring the vibration, a 3-axis accelerometer can be used and combined with the pressure and temperature sensors to detect all three conditions as a unitary PVT sensor.

Preferred placement for PVT sensor 602 is shown in FIG. 6. Preferably, PVT sensor 602 is mounted in a threaded port located in proximity to valve caps 155 and 156. This mounting position enables PVT sensor 602 to sense the pressure of incoming gas. It should be understood that, alternatively or in addition to sensing the pressure of incoming gas, pressure sensors such as PVT sensor 602 may be mounted at positions 604 and/or 606, where cylinder bore pressure can be measured. Positions 604 and 606 are threaded openings into which PVT sensor 602 may be mounted.

For measuring cylinder bore pressure, PVT sensor 602 is preferably a higher bandwidth sensor to pick up the pressure pulsations. It is contemplated that PVT sensor 602 is set to take intermittent full pressure readings during operation. Preferably, a valve (not shown) is used to isolate PVT sensor 602 from full pressure readings during 95% of operation, with the other 5% of operation exposing PVT sensor 602 to the full bore pressure. During the majority of operation, the valve is off so that the full bore pressure bypasses PVT sensor 602 through an orifice to a low-pass filter. The low-pass filter smooths out the higher frequencies such that PVT sensor 602 is essentially measuring an average pressure over the time during which PVT sensor 602 is bypassed. When the valve is on, PVT sensor 602 receives the full bore pressure.

For detecting vibration, the mounting position of PVT sensor 602 provides an advantageous location. Because excessive vibration during operation of compressor 170 typically is a sign of significant operational problems, detecting vibrations below any problematic threshold can prevent significant downtime and significant expense, both in loss of use and repairs or replacement. Although PVT sensor 602 could be placed on the end of compressor 170, the only likely difference as compared to the placement shown in FIG. 6 is possible larger amplitude of the vibration measurements. Signal-to-noise ratio would not be expected to be significantly different when PVT sensor 602 is mounted in the position shown.

Another aspect along with sensing vibration of compressor 170 is to use the resulting data to resolve the vibration to prevent damage to compressor 170 or other associated components of the system. It is proposed that using an on-board spectrum analyzer to process the data from PVT sensor 602 continuously and in real time is a first step to resolving issues related to excessive vibration. Spectral analysis considers the characteristic frequencies observed in the vibration signature.

Figure 7:
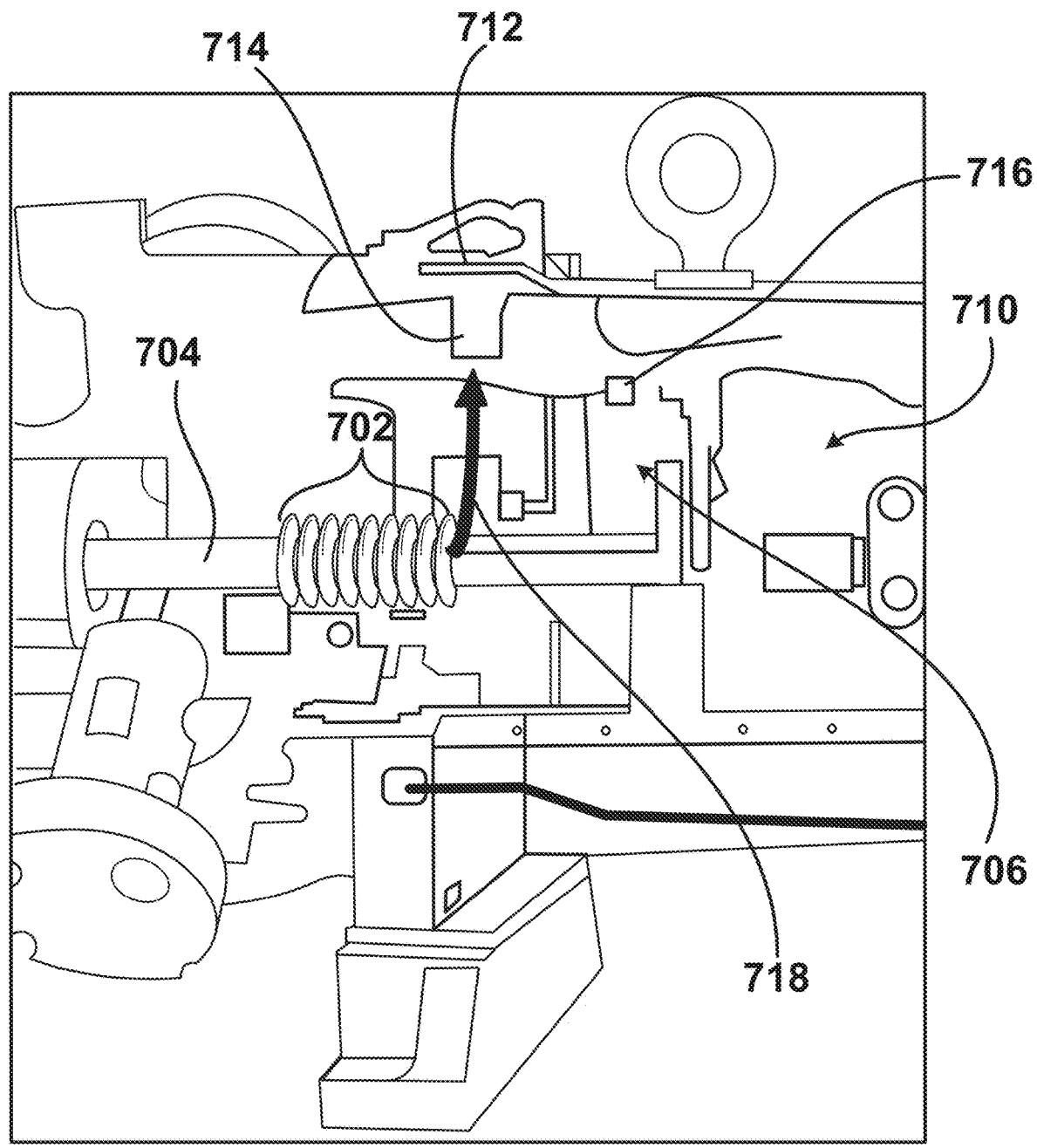
FIG. 7 illustrate an example sealing packing.

Another gas leak detection scenario, particularly relating to sealing packing, is contemplated in disclosed embodiments. FIG. 7 shows packing 702 around crosshead rod 704. Packing 702 is positioned in proximity to the space 706 between the compressor frame 708 and the cylinder 710. Any gas that gets past packing 702 is vented from space 706 through vent 712. In at least some applications, vent 712 is a free-flowing vent.

To detect a leak associated with packing 702, a differential temperature probe 714 may be mounted within the flow path of the leaked gas, represented by flow arrow 718, as the gas flows toward vent 712. Because a packing leak will increase the pressure within space 706, this pressure differential will cause gas to flow toward vent 712. Another temperature sensor 716 may be proximally positioned to measure the temperature of the compressor frame 708. By differentially measuring the temperature of the gas that is flowing relative to the temperature of the compressor frame 708, when the temperature of the gas is hotter than the compressor frame 708, this suggests that gas is flowing which, in turn, suggests a packing leak. This is in contrast to the scenario when there is no net flow of gas toward and out of vent 712. In such a scenario, any stagnant gas present in space 706 will naturally acclimate to the temperature of compressor frame 708, indicative of desired operating conditions, i.e., no packing leak.

The disclosures of this patent application, including the descriptions, drawings, and claims, describe one or more embodiments of the invention in more detail. Many other features, objects, and advantages of the invention will be apparent from these disclosures to one of ordinary skill in the art, especially when considered in light of a more exhaustive understanding of the numerous difficulties and challenges faced by the art. While there are many alternative variations, modifications and substitutions within the scope of the invention, one of ordinary skill in the art should consider the scope of the invention from a review of any claims that may be appended to applications and patents based hereon (including any amendments made to those claims in the course of prosecuting this and related applications).

Such other embodiments are generally intended to fall within the scope and meaning of the appended claims. Hence the drawings and detailed descriptions herein should be considered illustrative, not exhaustive. They do not limit the invention to the particular forms and examples disclosed. To the contrary, the invention includes many further modifications, changes, rearrangements, substitutions, alternatives, design choices, and embodiments apparent to those of ordinary skill in the art, without departing from the spirit and scope of this invention. In any case, all substantially equivalent systems, articles, and methods should be considered within the scope of the invention and, absent express indication otherwise, all structural or functional equivalents are anticipated to remain within the spirit and scope of the presently disclosed systems and methods.

We claim:

1. A system for skid-mounted reciprocating natural gas compressors driven by an engine with an associated engine controller and an engine data gateway, comprising:

a control panel having a display;

a plurality of condition sensors configured to sense one or more conditions relating to operation of a skid-mounted reciprocating natural gas compressor;

a wireless gateway in electronic communication with the control panel, the wireless gateway configured to receive and transmit data, wherein at least some of the data received is related to sensed conditions measured by the plurality of condition sensors;

a back office server located at a location remote from the system, wherein the wireless gateway is configured to communicate data to the back office server;

wherein the display on the control panel is configured to display one or more digital gauges, wherein each of the one or more digital gauges comprises a digital needle that displays a reading of a sensed condition measured by one of the plurality of condition sensors, a position of the digital needle relative to an ideal needle position on the each of the one or more digital gauges is determined by an Artificial Intelligence (AI) engine that receives a data set comprising the sensed conditions measured by the plurality of condition sensors, the ideal needle position corresponds to an optimal value for the sensed condition, each of the one or more digital gauges is color coded, and each of the one or more digital gauges centers a respective scale of the reading of the sensed condition around the optimal value for the sensed condition, wherein:

a first color represents an optimal range of values of the sensed condition based on an engineering model for the skid-mounted reciprocating natural gas compressor, wherein a center of the optimal range of values represented by the first color represents the optimal value for the sensed condition;

a second color represents a range of values above an uppermost limit and below a lowermost limit of the optimal range of values; and a third color represents a range of values outside the uppermost limit and the lowermost limit represented by the second color; and wherein the back office server comprises an associated display configured to display the data received from the wireless gateway, and wherein the associated display includes digital gauges for displaying the sensed conditions in the data received from the wireless gateway.

2. The system as defined in claim 1, wherein the plurality of condition sensors comprises a plurality of temperature sensor assemblies each having a thermowell and an associated light emitting diode (LED), wherein each temperature sensor assembly in the plurality of temperature sensor assemblies is configured to sense a temperature in proximity to a valve cap associated with the skid-mounted reciprocating natural gas compressor, and, when the temperature sensor assembly senses an out-of-tolerance temperature, the LED is adapted to emit light.

3. The system as defined in claim 2, wherein the thermowell is positioned approximately in the middle of the valve cap associated with the skid-mounted reciprocating natural gas compressor such that the thermowell enters the valve cap in a perpendicular orientation to a face of the valve cap.

4. The system as defined in claim 1, wherein the plurality of condition sensors comprises one or more pressure transmitters, each pressure transmitter including a pressure transducer configured to sense a pressure during operation of the skid-mounted reciprocating natural gas compressor, wherein each pressure transmitter is mounted on the skid-mounted reciprocating natural gas compressor.

5. The system as defined in claim 1, wherein the first color is green, the second color is yellow, and the third color is red.

6. The system as defined in claim 1, wherein the wireless gateway meets regulatory compliance certifications including Canadian Standards Association (CSA) Class 1 Division 2 (Groups B, C, D) (North America), and the wireless gateway further is Ingress Protection (IP) 67 compliant.

7. The system as defined in claim 1, wherein the each of the one or more digital gauges varies the respective scale continuously based on current operating parameters.

8. The system as defined in claim 1, wherein the wireless gateway communicates with the back office server using cellular protocols or satellite transmission.

9. The system as defined in claim 1, wherein the wireless gateway utilizes protocols including one or more of Transmission Control Protocol/Internet Protocol (TCP/IP), Modbus Remote Terminal Unit (RTU) Master, Modbus RTU Slave, Modbus TCP, Short Message Service (SMS) messaging, or and a Wi-Fi Access Point.

10. The system as defined in claim 1, wherein the wireless gateway is configured to relay a message to the engine data gateway, wherein the message comprises a manufacturer's update to the associated engine controller.

11. A system for skid-mounted reciprocating natural gas compressors driven by an engine with an associated engine controller and an engine data gateway, comprising:

a control panel having a display; and a plurality of condition sensors configured to sense one or more conditions relating to operation of a skid-mounted reciprocating natural gas compressor, wherein the display on the control panel is configured to display one or more digital gauges, wherein each of the one or more digital gauges comprises a digital needle that displays a reading of a sensed condition measured by one of the plurality of condition sensors, a position of the digital needle relative to an ideal needle position on the each of the one or more digital gauges is determined by an Artificial Intelligence (AI) engine that receives a data set comprising sensed conditions measured by the plurality of condition sensors, the ideal needle position corresponds to an optimal value for the sensed condition, each of the one or more digital gauges is color coded, and each of the one or more digital gauges centers a respective scale of the reading of the sensed condition around the optimal value for the sensed condition, wherein:

a first color represents an optimal range of values of the sensed condition based on an engineering model for the skid-mounted reciprocating natural gas compressor, wherein a center of the optimal range of values represented by the first color represents the optimal value for the sensed condition, a second color represents a range of values above an uppermost limit and below a lowermost limit of the optimal range of values, and a third color represents a range of values outside the uppermost limit and the lowermost limit represented by the second color.

12. The system of claim 11, further comprising:

a wireless gateway in electronic communication with the control panel, the wireless gateway configured to receive and transmit data, wherein at least some of the data received is related to the sensed conditions measured by the plurality of condition sensors; and a back office server located at a location remote from the system, wherein the wireless gateway is configured to communicate data to the back office server, wherein the back office server comprises an associated display configured to display the data received from the wireless gateway, and wherein the associated display includes digital gauges for displaying the sensed conditions in the data received from the wireless gateway.

13. The system as defined in claim 1, wherein the AI engine employs a non-linear curve fit to sensor data points or positions of one or more digital needles on the one or more digital gauges.

14. The system as defined in claim 1, wherein the AI engine receives the data set comprising sensor data related to parameters comprising one or more of valve cap temperatures, suction valve pressures, or discharge valve pressures, and the AI engine determines whether a leak is occurring and where that leak is occurring with respect to compressor components.

15. The system as defined in claim 14, wherein the leak comprises a valve leak, a piston ring leak, a leak around a packing, or a leak in process piping.

\* \* \* \* \*